United States Patent

Hayashi et al.

(10) Patent No.: US 8,248,540 B2
(45) Date of Patent: Aug. 21, 2012

(54) BROADCAST SIGNAL RECEIVING APPARATUS

(75) Inventors: Takafumi Hayashi, Osaka (JP); Hiroshi Yamaga, Nara (JP); Hirofumi Okada, Daito (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 932 days.

(21) Appl. No.: 12/204,126

(22) Filed: Sep. 4, 2008

(65) Prior Publication Data

US 2009/0066851 A1 Mar. 12, 2009

(30) Foreign Application Priority Data

Sep. 6, 2007 (JP) ................................. 2007-231377

(51) Int. Cl.
*H04N 4/44* (2006.01)
(52) U.S. Cl. ........ 348/734; 348/706; 348/563; 348/731; 340/12.22; 340/12.55; 340/12.52; 340/13.32; 345/169; 345/7; 345/327; 345/810; 715/834
(58) Field of Classification Search .................. 348/734, 348/706, 563, 731; 340/12.22, 12.55, 12.52, 340/13.32; 345/169, 327, 810; 715/834
See application file for complete search history.

(56) References Cited

U.S. PATENT DOCUMENTS

| 5,371,553 | A | * | 12/1994 | Kawamura et al. | 725/59 |
| 6,028,600 | A | * | 2/2000 | Rosin et al. | 715/718 |
| 6,230,325 | B1 | * | 5/2001 | Iinuma et al. | 725/110 |
| 6,266,098 | B1 | * | 7/2001 | Cove et al. | 348/563 |
| 6,285,357 | B1 | * | 9/2001 | Kushiro et al. | 345/169 |
| 7,036,090 | B1 | * | 4/2006 | Nguyen | 715/834 |
| 7,091,998 | B2 | * | 8/2006 | Miller-Smith | 715/810 |
| 2004/0199552 | A1 | * | 10/2004 | Ward et al. | 707/204 |
| 2007/0192811 | A1 | * | 8/2007 | Nebashi et al. | 725/90 |
| 2008/0143734 | A1 | * | 6/2008 | Ishii et al. | 345/581 |
| 2008/0310628 | A1 | * | 12/2008 | Fujioka et al. | 380/201 |

FOREIGN PATENT DOCUMENTS

| JP | 2003-018495 A | 1/2003 |
| JP | 2007-194782 A | 8/2007 |

* cited by examiner

*Primary Examiner* — Jefferey Harold
*Assistant Examiner* — Mustafizur Rahman
(74) *Attorney, Agent, or Firm* — Westerman, Hattori, Daniels & Adrian, LLP (57) ABSTRACT

In a broadcast signal receiving apparatus, a remote controller has, as one of a plurality of buttons thereof, a state changing button for instructing to change a source to be reproduced by a main body. The main body or the remote controller has a memory storing a first state changing table indicating an order in which the source is changed. When the state changing button is operated, if the broadcast signal is being received by the tuner portion and reproduced as the source, the main body performs state change such that the first source in the first state changing table is specified as the source to be reproduced by the main body.

2 Claims, 10 Drawing Sheets

BROADCAST SIGNAL RECEIVING APPARATUS

This nonprovisional application claims priority under 35 U.S.C. §119(a) on Patent Application No. 2007-231377 filed in Japan on Sep. 6, 2007, the entire contents of which are hereby incorporated by reference.

BACKGROUND OF THE INVENTION

1. Field of the Invention

The present invention relates to broadcast signal receiving apparatuses having a remote controller for performing remote control operation, and more particularly to a broadcast signal receiving apparatus having an external input to which an external image signal or audio signal is inputted.

2. Description of Related Art

Today, with the development of digital processing technology, compression coding technology, and broadcast communication technology, digital television broadcasting communication is in practical use. The digital television broadcasting communication was first applied to satellite broadcasting such as BS (broadcasting satellite) broadcasting or CS (communication satellite) broadcasting, and was then applied to terrestrial broadcasting. As for terrestrial broadcasting in Japan, analog broadcasting communication and digital broadcasting communication are currently performed for the same contents with the aim of completing the transition from analog to digital broadcasting in 2011.

As described above, there are different types of communication systems including not only terrestrial broadcasting and satellite broadcasting, but also digital broadcasting and analog broadcasting, to offer television broadcasting service. To deal with this situation, a broadcast signal receiving apparatus (television receiver) provided with tuners for different types of communication systems to receive all the television broadcasting services according to these different types of communication systems has previously been proposed.

Incidentally, the broadcast signal receiving apparatus has external input functions for receiving image and audio signals constituting the content from a reproducing apparatus such as a video tape player or a DVD player. The external input functions have come to be diversified into various kinds including, in addition to a conventional external input such as a video input using an RCA terminal or S-terminal, an external input using a D-terminal serving as an input terminal for digital broadcasting and an external input using an HDMI (high-definition multimedia interface) terminal or a D-SUB terminal used for connection with digital consumer electronics, such as PCs, that have come into widespread use in recent years.

Moreover, the broadcast signal receiving apparatus is provided not only with an input button that is directly operated by the user, but also with a remote control system using a remote controller (hereinafter a "remote control") for performing remote control operation. Currently, a broadcast signal receiving apparatus that can receive terrestrial digital broadcasting, terrestrial analog broadcasting, and satellite broadcasting is made available. As shown in an external view in FIG. 10, a remote control used in a remote control system of such a broadcast signal receiving apparatus includes, in addition to buttons 101 for specification of the channel and buttons 102 for changing the volume or channel, broadcast specification buttons 103a to 103d for specification of broadcasting to be received.

Figure 10:
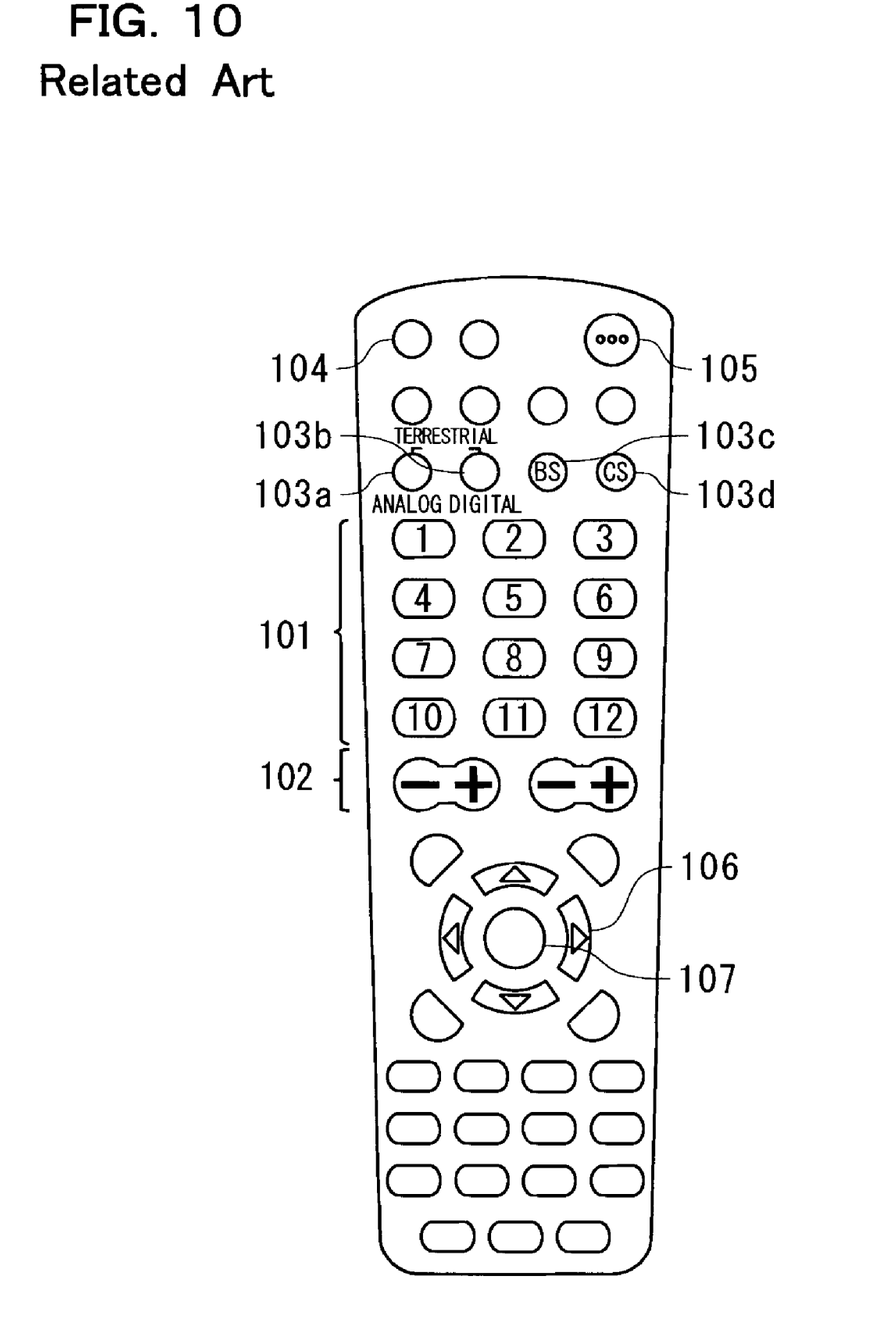
FIG. 10 is a schematic diagram showing the appearance of the remote control of the broadcast signal receiving apparatus.

That is, if the user presses the broadcast specification button 103a, the broadcast signal receiving apparatus is instructed to receive terrestrial analog broadcasting; if the user presses the broadcast specification button 103b, the broadcast signal receiving apparatus is instructed to receive terrestrial digital broadcasting; if the user presses the broadcast specification button 103c, the broadcast signal receiving apparatus is instructed to receive BS broadcasting; and if the user presses the broadcast specification button 103d, the broadcast signal receiving apparatus is instructed to receive CS broadcasting.

Furthermore, since this broadcast signal receiving apparatus not only receives different broadcast signals, but also receives different external inputs, it is necessary to specify, with the remote control, not only a broadcast signal reception state in which a broadcast signal is received, but also an external input state in which an external input is received. Thus, the remote control shown in FIG. 10 includes a state changing button 104 as a button for instructing to change the broadcast signal reception state and the external input state.

As a result, it is possible to change the operation of the broadcast signal receiving apparatus in sequence to each of the reception operations of different broadcast signals and different external inputs with each press of the state changing button 104. That is, it is possible to change the operation of the broadcast signal receiving apparatus in sequence from reception of terrestrial digital broadcasting, to reception of terrestrial analog broadcasting, to reception of BS broadcasting, to reception of CS broadcasting, to reception of video input, to reception of DVD input, to reception of HDMI input, and to reception of PC input, for example, by pressing the state changing button 104.

In the conventional remote control system using the remote control constructed as shown in FIG. 10, changing a broadcast signal to be received only requires pressing any one of the broadcast specification buttons 103a to 103d once. However, depending on the current operating state, specifying an external input may require pressing the state changing button 104 multiple times. The reason is as follows. The operating state is changed by the state changing button 104 in a previously determined order. As a result, when the current operating state is changed to the next operating state, it may be changed to a different broadcast signal reception state. This requires the state changing button 104 to be pressed again until the operating state is eventually changed to a desired external input.

As described above, in a case where a broadcast signal to be received is changed, the presence of the special buttons such as broadcast specification buttons 103a to 103d makes changing operation using the remote control less troublesome. However, in a case where the operating state is changed from a broadcast signal reception state to an external input state, it is sometimes necessary to press the state changing button 104 multiple times, making the changing operation troublesome. Certainly, it is possible to provide additional buttons for specification of an external input in order to reduce the number of times the state changing button 104 is pressed. However, if the required number of buttons having a size easy to press are provided, this inconveniently leads to a larger button area, and to a larger remote control.

SUMMARY OF THE INVENTION

According to one aspect of the present invention, a broadcast signal receiving apparatus is provided with: a main body including a tuner portion receiving a broadcast signal as a source to be reproduced, an external input portion to which an external signal is inputted as the source, and a first communication portion communicating with a remote controller; and a remote controller including a second communication portion communicating with the first communication portion of the main body, and a plurality of buttons for specifying an operation of the main body. Here, the remote controller includes, as one of the plurality of buttons, a state changing button for instructing to change the source reproduced by the main body. The main body or the remote controller includes a memory for storing a first state changing table indicating the order in which the source is changed. When the state changing button is operated, if the broadcast signal is being received by the tuner portion and reproduced as the source, the main body performs state change such that the first source in the first state changing table is specified as the source to be reproduced by the main body.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, the present invention will be described by way of a specific embodiment with reference to the accompanying drawings. Hereinafter, embodiments of the present invention will be described, taking up a television broadcasting reproducing apparatus as an example, the television broadcasting reproducing apparatus provided with an image display portion, such as a CRT (cathode ray tube), an LCD (liquid crystal display), or a PDP (plasma display panel), that displays images of broadcast signals. However, the invention may be applied to a broadcast signal receiving apparatus of any other type as long as it has a tuner for receiving a broadcast signal and receives an externally inputted image signal and audio signal; for example, the invention may be applied to a tuner device connected to a recording/reproducing apparatus, such as a VCR (video cassette recorder) or a DVD (digital versatile disc) recorder, that performs recording/reproduction on recording media, or an image display apparatus.

Configuration of a Broadcast Signal Receiving Apparatus

Figure 1:
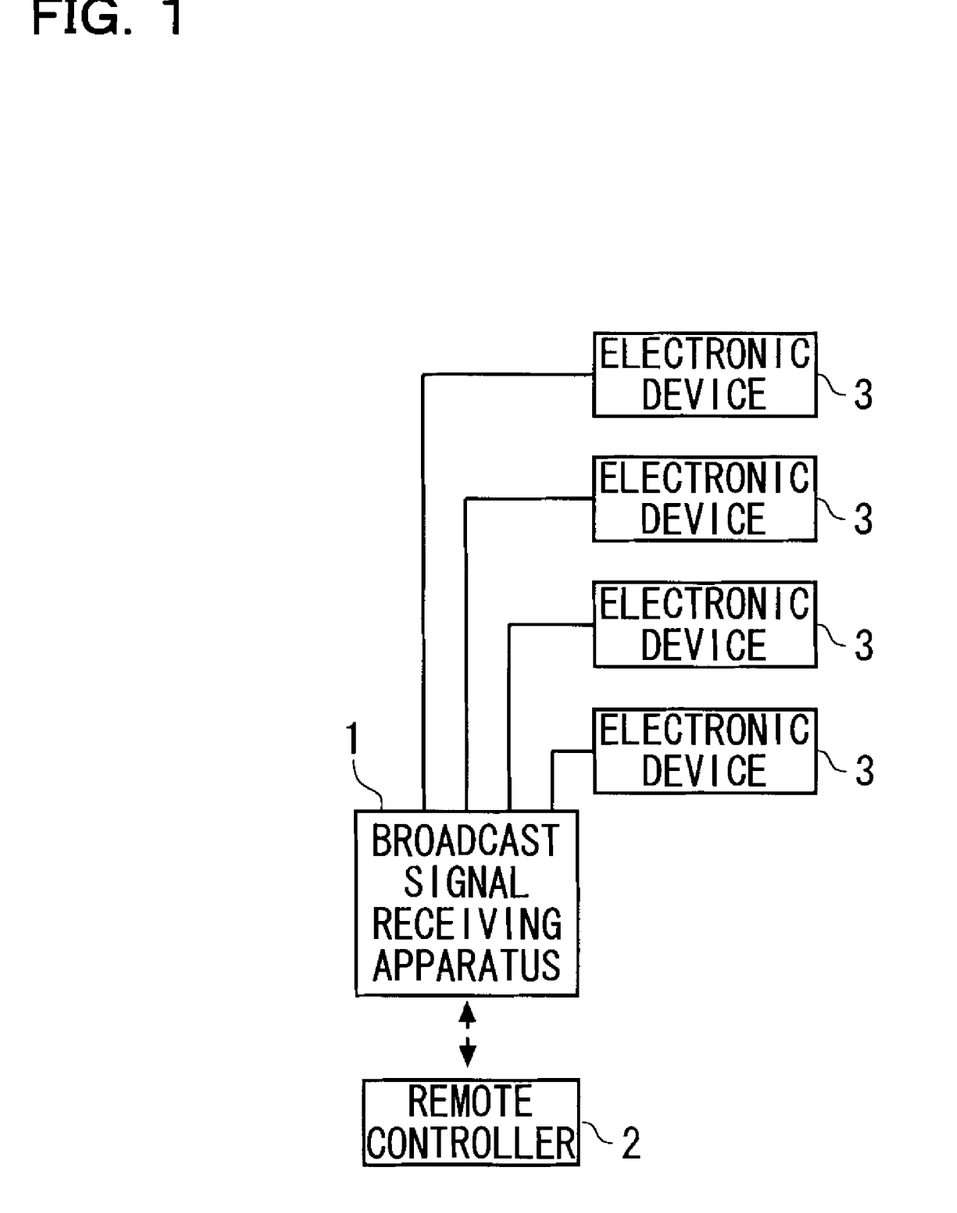
FIG. 1 is a block diagram showing an example of the connection relationship of a broadcast signal receiving apparatus according to the invention.
Figure 2:
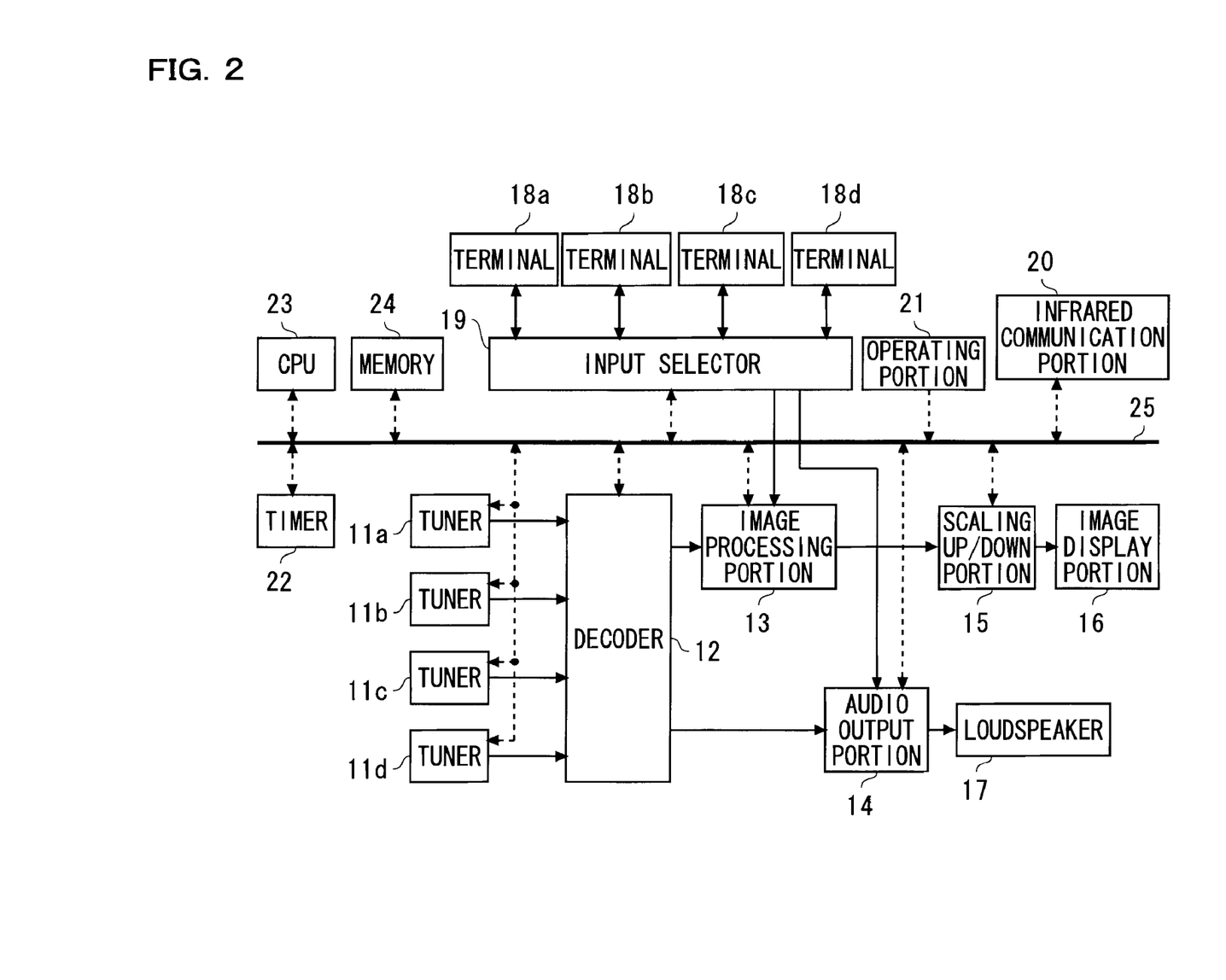
FIG. 2 is a block diagram showing an example of the internal configuration of the main body of the broadcast signal receiving apparatus shown in FIG. 1.
Figure 3:
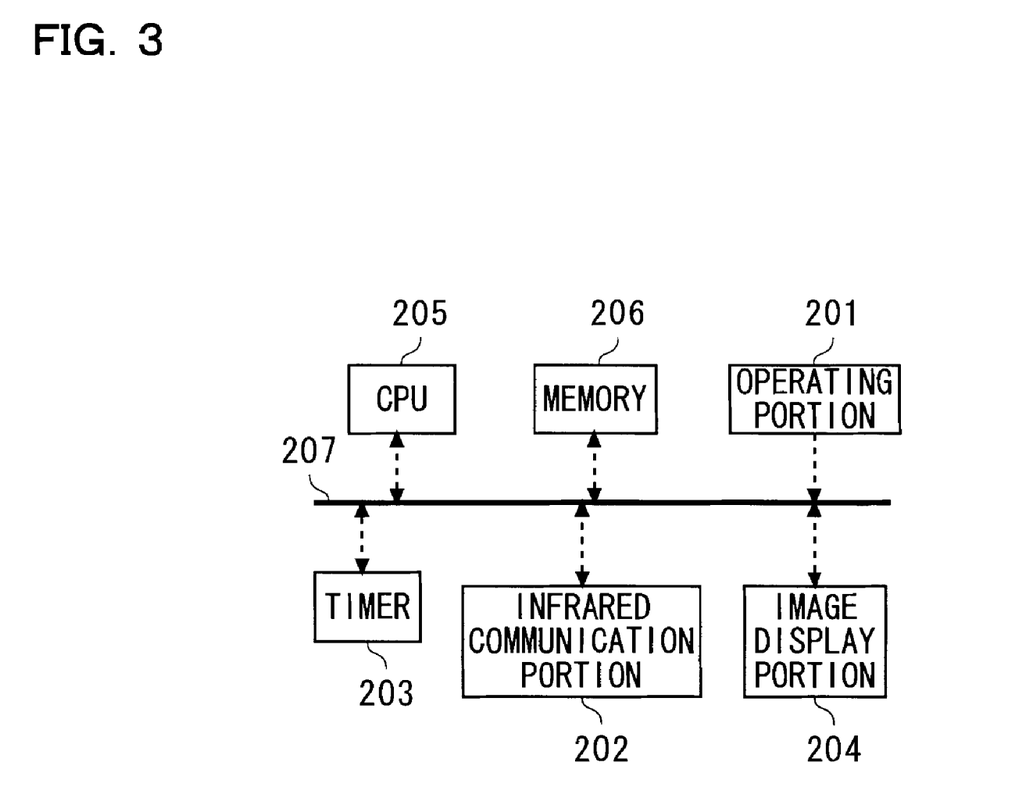
FIG. 3 is a block diagram showing an example of the internal configuration of the remote control of the broadcast signal receiving apparatus shown in FIG. 1.

First, the configuration of a broadcast signal receiving apparatus will be described with reference to the accompanying drawings. FIG. 1 is a block diagram showing the configuration of a system including the broadcast signal receiving apparatus of this embodiment. FIG. 2 is a block diagram showing an example of the internal configuration of the broadcast signal receiving apparatus shown in FIG. 1. FIG. 3 is a block diagram showing an example of the internal configuration of the remote control attached to the broadcast signal receiving apparatus shown in FIG. 1. As is the case with a conventional remote control, the remote control having the internal configuration shown in FIG. 3 has an appearance shown in FIG. 10.

1. Connection Relationship of the Broadcast Signal Receiving Apparatus

As shown in FIG. 1, the broadcast signal receiving apparatus of this embodiment includes a main body 1 (hereinafter referred to simply as a "main body 1") of the broadcast signal receiving apparatus that receives a broadcast signal and reproduces the broadcast signal thus received, a remote control 2 that performs remote control operation by communicating with the main body 1 by wireless communication such as infrared communication, and electronic devices 3, such as a recording/reproducing apparatus for performing recording/reproduction on recording media, a tuner device, or a PC, that transmit an image signal and an audio signal to the main body 1. In this configuration, each electronic device 3 and the main body 1 are connected together with a cable or wirelessly so as to enable communication between them, and image and audio signals are transmitted from the electronic device 3 to the main body 1. Hereinafter, as an example of implementation, a description will be given of a case where the electronic device 3 and the main body 1 are connected together with a cable; however, as described above, it is also possible to connect them wirelessly by using an IEEE802.11 wireless LAN, Bluetooth, or the like.

When the connection relationship shown in FIG. 1 is established, if the electronic device 3 is connected to, for example, an RCA terminal, an S-terminal, a D-terminal, an HDMI terminal, a D-SUB terminal, or the like, of the main body 1, image and audio signals from the electronic device 3 are transmitted to the main body 1. The image and audio signals transmitted from the electronic device 3 are treated as external inputs in the main body 1, and reproduced as images and audio. When the remote control 2 is operated, an operation instructed with the remote control thus operated is transmitted as an infrared signal from the remote control 2 to the main body 1. In the main body 1 that has received the infrared signal from the remote control 2, the operation instructed by the user is recognized based on the received infrared signal, and the operation thus recognized is performed.

2. Configuration of the Main Body of the Broadcast Signal Receiving Apparatus

Next, with reference to the block diagram shown in FIG. 2, the configuration of the main body 1 of the broadcast signal receiving apparatus shown in FIG. 1 will be described.

The main body 1 of the broadcast signal receiving apparatus shown in FIG. 2 includes: tuners 11a to 11d that each receive a corresponding one of the broadcast signals of terrestrial analog broadcasting, terrestrial digital broadcasting, BS broadcasting, and CS broadcasting, and demodulate the broadcast signal thus received; a decoder 12 that decodes the broadcast signal obtained as a result of demodulation by any one of the tuners 11a to 11d; an image processing portion 13 that performs various image processing for an image signal obtained as a result of decoding by the decoder 12; an audio output portion 14 that performs computation operation for an audio signal obtained as a result of decoding by the decoder 12 to convert it into an analog signal; a scaling up/down portion 15 that scales an image up/down, the image based on the image signal processed by the image processing portion 13; an image display portion 16 that performs image display by receiving the image signal from the scaling up/down portion 15; a loudspeaker portion 17 that outputs sound by receiving the audio signal from the audio output portion 14; external input terminals 18a to 18d connected to the electronic devices 3; an input selector 19 that selects connection with the external input terminals 18a to 18d; an infrared communication portion 20 that communicates with the remote control 2 by transmitting/receiving an infrared signal; an operating portion 21 to which an instruction is directly inputted by the user; a timer 22 that measures the current time or time limit of each operation; a CPU (central processing unit) 23 that controls an overall driving operation of the apparatus; a memory 24 that stores different programs for different operations, and temporarily stores data required for execution of the program; and a bus line 25 that enables the exchange of data between the blocks.

According to the broadcast signal receiving apparatus having the main body 1 configured as described above, if an instruction is given to receive terrestrial analog broadcasting, the tuner 11a operates to select a broadcast signal of the specified channel. The broadcast signal selected by the tuner 11a is demodulated, and is then inputted to the decoder 12. The demodulated broadcast signal is decoded by the decoder 12, and is then converted into an image signal and an audio signal. If an instruction is given to receive terrestrial digital broadcasting, the tuner 11b operates; if an instruction is given to receive BS broadcasting, the tuner 11c operates; and if an instruction is given to receive CS broadcasting, the tuner 11d operates.

The tuners 11a to 11d each perform selection and demodulation operation according to their broadcasting system, and the decoder 12 performs decoding operation according to each broadcasting system. Decoding operation performed by the decoder 12 is stored in the memory 24, and decoding operation for a specified broadcasting system is read from the memory 24 and is then given to the decoder 12. In this way, a specified decoding operation is performed.

The image signal obtained by the decoder 12 is inputted to the image processing portion 13. For example, in a case where an interlaced image signal is inputted, it is interpolated and thereby converted into a progressive image signal. After performing these image processing, the image processing portion 13 further produces a brightness signal and a color-difference signal based on the obtained image signal. Then, the image processing portion 13 produces color signals representing a pixel value according to color pixels of the image display portion 16. That is, based on the brightness signal and the color-difference signal, the image processing portion 13 produces color signals representing a pixel value according to the RGB arrangement of the color pixels, and outputs the color signals thus produced to the scaling up/down portion 15 as an image signal.

In the scaling up/down portion 15, an image represented by the image signal obtained as a result of the processing performed by the image processing portion 13 is scaled up/down according to the size of an image to be displayed on the image display portion 16. When the image is scaled up, interpolating processing is performed for each color signal contained in the image signal from the image processing portion 13; when the image is scaled down, thinning-out processing is performed for each color signal contained in the image signal from the image processing portion 13. The image signal scaled up/down by the scaling up/down portion 15 is inputted to the image display portion 16, and an image based on that image signal is reproduced and outputted from the image display portion 16. Incidentally, when there is no need to scale the image up/down, the image signal from the image processing portion 13 is inputted to the image display portion 16 as it is.

The audio signal obtained by the decoder 12 is inputted to the audio output portion 14, and is then converted into an analog signal that the loudspeaker portion 17 can output. As a result, when the audio signal obtained by the audio output portion 14 is inputted to the loudspeaker portion 17, the sound based on that audio signal is reproduced and outputted from the loudspeaker portion 17. In this way, the sound suitable for a scene represented by the images reproduced and displayed by the image display portion 16 is reproduced and outputted from the loudspeaker portion 17.

The external input terminals 18a to 18d are each built as any one of an RCA terminal, an S-terminal, a D-terminal, an HDMI terminal, and a D-SUB terminal. In this case, to the external input terminal built as an RCA terminal, the electronic device 3 that transmits an image signal and an audio signal by using separate cables is connected. To the external input terminal built as an S-terminal, the electronic device 3 that transmits a composite video signal by using a single cable is connected. To the external input terminal built as a D-terminal, the electronic device 3 that transmits a component video signal by using a single cable is connected. To the external input terminal built as an HDMI terminal, the electronic device 3 such as digital consumer electronics is connected. To the external input terminal built as a D-SUB terminal, the electronic device 3 such as a PC is connected.

When the image and audio signals from the external input terminals 18a to 18d are inputted, via the input selector 19, a selected image signal is inputted to the image processing portion 13 and a selected audio signal is inputted to the audio output portion 14. That is, the input selector 19 selects one of the external input terminals 18a to 18d as the external input terminal to which the image and audio signals are inputted, and the image and audio signals inputted to the selected external input terminal are inputted to the image processing portion 13 and the audio output portion 14, respectively. As a result of the image processing portion 13, the audio output portion 14, and the scaling up/down portion 15 operating in the manner as described above, the image and sound of the content reproduced by the electronic device 3 are reproduced and outputted from the image display portion 16 and the loudspeaker portion 17, respectively.

Furthermore, the infrared communication portion 20 communicates with the remote control 2 by infrared communication. That is, upon receiving an infrared signal in the form of light from the remote control 2, the infrared communication portion 20 converts the light thus received into an electrical signal, and demodulates and decodes the electrical signal thus obtained. In this way, the infrared communication portion 20 checks the instruction given by the remote control 2. In addition, when a signal such as an ACK signal indicating the completion of checking of the instruction given by the remote control 2 in the form of an infrared signal, or an error signal indicting the occurrence of communication error is produced, the infrared communication portion 20 encodes the ACK signal or the error signal thus produced, and then modulates the signal thus encoded. Then, the infrared communication portion 20 transmits the resultant signal to the remote control 2 by emitting light as an infrared signal.

3. Configuration of the Remote Control

Next, with reference to the block diagram shown in FIG. 3, the configuration of the remote control 2 that remotely controls the main body 1 of the broadcast signal receiving apparatus shown in FIG. 1 will be described.

The remote control 2 shown in FIG. 3 includes: an operating portion 201 built with different operation buttons; infrared communication portion 202 that communicates with the main body 1 by transmitting and receiving an infrared signal; a timer 203 for measuring time; an image display portion 204 built with an LCD for displaying the current time or the operating state of the main body 1 as images; a CPU 205 that controls overall driving operation of the remote control 2; a memory 206 that stores different programs for different operations and temporarily stores data required for execution of the program; and a bus line 207 that enables the exchange of data between the blocks.

As is the case with a conventional remote control, the remote control 2 configured as described above has an appearance shown in FIG. 10. That is, the remote control 2 includes, as the operating portion 201, buttons 101 for specification of the channel, buttons 102 for changing the volume or channel, broadcast specification buttons 103a to 103d for specification of broadcasting to be received, a state changing button 104 for instructing to change a broadcast signal reception state and an external input state by changing a source to be reproduced, a power button 105 for instructing to turn on/off the power to the main body 1, arrow buttons 106 for moving a pointer in a GUI (graphical user interface) display on the image display portion 16 of the main body 1 so as to perform function setting or the like, and an OK button 107 for setting the function indicated by the pointer in the GUI display on the image display portion 16.

With this configuration, the user is allowed to specify a desired channel number by specifying the number by using the buttons 101 or changing the channel in sequence by using the buttons 102. In addition, it is possible to control the volume of the sound outputted from the loudspeaker portion 17 of the main body 1 by the number of times the button 102 is pressed. Furthermore, by assigning not only numbers but also characters to the buttons 101, it is also possible to enter text in the GUI display on the image display portion 16 of the main body 1 or the image display portion 204 of the remote control 2.

If the broadcast specification button 103a is pressed, the broadcast signal receiving apparatus is instructed to receive the terrestrial analog broadcasting; if the broadcast specification button 103b is pressed, the broadcast signal receiving apparatus is instructed to receive the terrestrial digital broadcasting; if the broadcast specification button 103c is pressed, the broadcast signal receiving apparatus is instructed to receive the BS broadcasting; and, if the broadcast specification button 103d is pressed, the broadcast signal receiving apparatus is instructed to receive the CS broadcasting. The state changing button 104 is pressed to instruct to change a source reproduced by the main body 1; that is, the state changing button 104 is pressed to change a signal to be reproduced and outputted to any one of a plurality of broadcast signals or signals from the electronic devices 3.

The instruction given by the button of the operating portion 201 shown in FIG. 10 is fed to the infrared communication portion 202, and is then encoded and modulated. Then, as is the case with the infrared communication portion 20 of the main body 1, the infrared communication portion 202 emits light based on the modulated signal, and thereby transmits an infrared signal to the main body 1. When receiving the infrared signal from the main body 1 in the form of light, the infrared communication portion 202 converts the light thus received into an electrical signal, and demodulates and decodes the electrical signal thus obtained. In this way, the infrared communication portion 202 recognizes the ACK signal or the error signal from the main body 1.

In the image display portion 204, the instruction inputted by the operating portion 201, the current time measured by the timer 203, the error detected during infrared communication with the main body 1, or the like, is displayed as an image. The timer 203 measures not only the current time, but also, for example, the time limit for receiving an infrared signal from the main body 1 at the time of infrared communication.

The above-described configuration and operation of the main body 1 and the remote control 2 are common to all the examples described below. In the broadcast signal receiving apparatus of this embodiment, the source reproduced by the main body 1 is changed in a previously set order by pressing the state changing button 104 provided in the operating portion 201 of the remote control 2. In the examples described below, operation performed by the remote control 2 when the state changing button 104 is pressed, and how to set the order in which the source reproduced by the main body 1 is changed will be described in detail.

EXAMPLE 1

In Example 1, the order in which the source is changed as a result of the state changing button 104 being pressed when the main body 1 of the broadcast signal receiving apparatus is reproducing a broadcast signal as a source is different from that observed when the main body 1 of the broadcast signal receiving apparatus is reproducing a signal from the electronic device 3 as a source. Hereinafter, with reference to a flow chart shown in FIG. 4, operation performed when the source is changed by pressing the state changing button 104 of the remote control 2 will be described.

Figure 4:
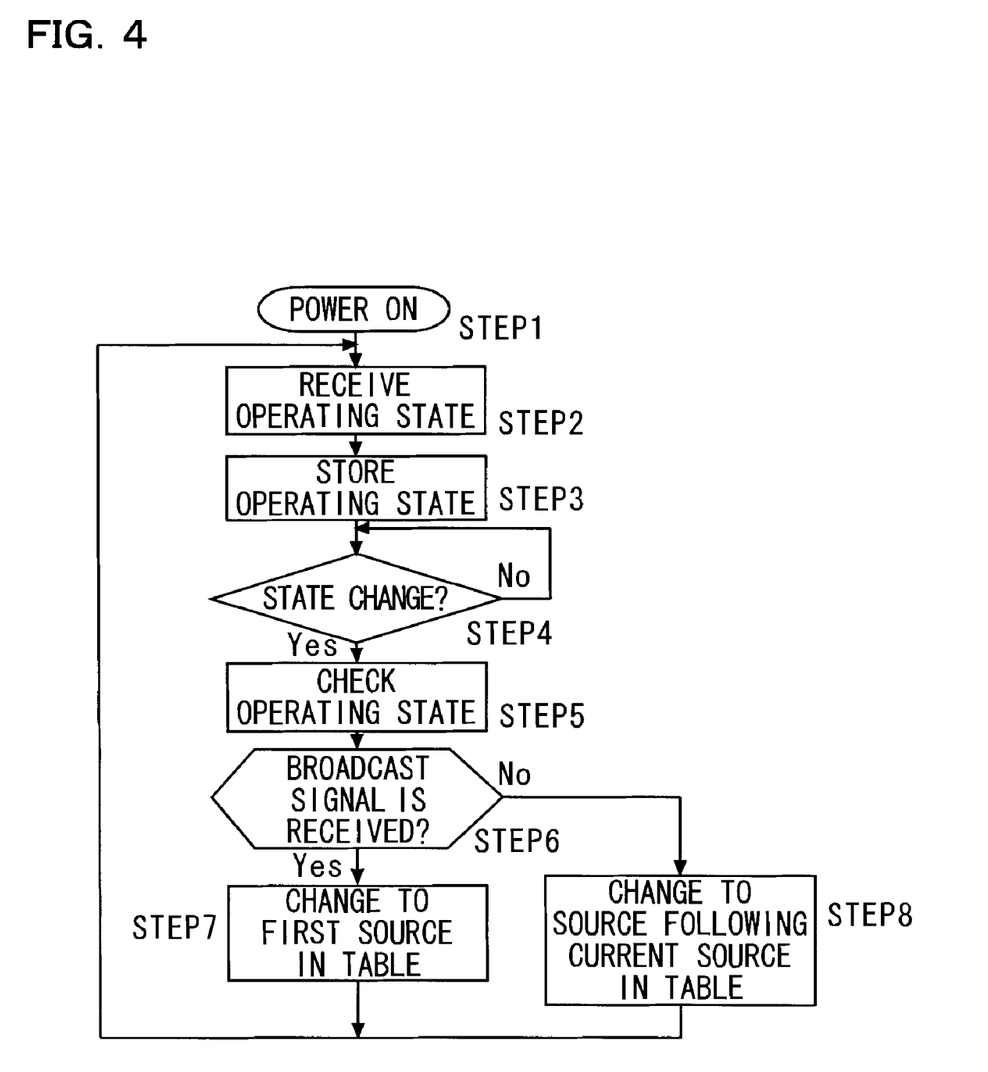
FIG. 4 is a flow chart showing the operating state of the remote control of the broadcast signal receiving apparatus in Example 1.

In this example, it is assumed that the source to be reproduced is changed in the following order: (1) an external input 1 received through the external input terminal 18a→(2) an external input 2 received through the external input terminal 18b→(3) an external input 3 received through the external input terminal 18c→(4) an external input 4 received through the external input terminal 18d. A state changing table indicating the above order is stored in the memory 206 of the remote control 2.

If the power button 105 of the remote control 2 is pressed to instruct to turn on the power to the main body 1 (STEP 1), a power-on infrared signal is produced by the infrared communication portion 202, and is then transmitted to the main body 1. Upon receiving this infrared signal with the infrared communication portion 20, the power to the main body 1 is turned on, and the source that had been reproduced at the last power-off is checked by checking the operating state stored in the memory 24.

Then, the image and sound represented by the source identified by the operating state stored in the memory 24 are reproduced and outputted by the image display portion 16 and the loudspeaker portion 17, respectively. That is, suppose that the terrestrial analog broadcasting was received by the tuner 11a at the last power-off. Then, the memory 24 stores, as the operating state, reception of the terrestrial analog broadcasting by the tuner 11a. Thus, when power-on is instructed by the remote control 2, since the operating state stored in the memory 24 indicates the reception of the terrestrial analog broadcasting by the tuner 11a, the terrestrial analog broadcasting starts to be received by the tuner 11a.

When the main body 1 starts reproduction operation based on the operating state stored in the memory 24, an infrared signal indicating the operating state stored in the memory 24, that is, the source that is being reproduced, is produced by the infrared communication portion 20, and is then transmitted to the remote control 2. Upon receiving the infrared signal from the main body 1 with the infrared communication portion 202 (STEP 2), the remote control 2 recognizes the source that is being reproduced by the main body 1 based on the infrared signal thus received, and stores it in the memory 206 as the current operating state (STEP 3).

Thereafter, the remote control 2 judges whether the state changing button 104 is pressed or not (STEP 4). If the state changing button 104 is found to be pressed (Yes), the remote control 2 reads the current operating state of the main body 1 stored in the memory 206, and checks the source that is currently reproduced by the main body 1 (STEP 5). By checking the current operating state of the main body 1 read from the memory 206, the remote control 2 judges whether or not the main body 1 is receiving a broadcast signal (STEP 6).

If the main body 1 is found to be receiving a broadcast signal (Yes in STEP 6), the remote control 2 checks the state changing table stored in the memory 206. Then, an infrared signal instructing to reproduce the first source in the state changing table is produced by the infrared communication portion 202, and is then transmitted to the main body 1 (STEP 7). That is, in this example, an infrared signal instructing to reproduce the external input 1 is transmitted to the main body 1. Upon receiving the infrared signal with the infrared communication portion 20, the main body 1 is made to operate such that the input selector 19 feeds the image and audio signals from the external input terminal 18a to the image processing portion 13 and the audio output portion 14, respectively.

If the main body 1 is found to be reproducing any one of the external inputs 1 to 4 as a source (No in STEP 6), the remote control 2 checks the state changing table stored in the memory 206. Then, an infrared signal instructing to reproduce a source following the source that is currently reproduced is produced by the infrared communication portion 202, and is then transmitted to the main body 1 (STEP 8). That is, in a case where the main body 1 is found to be reproducing the external input 1, an infrared signal instructing to reproduce the external input 2, which follows the external input 1, is transmitted to the main body 1. Upon receiving the infrared signal with the infrared communication portion 20, the main body 1 is made to operate such that the input selector 19 feeds the image and audio signals from the external input terminal 18b to the image processing portion 13 and the audio output portion 14, respectively.

When the operating state of the main body 1 is changed as described above, the main body 1 stores the current operating state thus changed, including the source, in the memory 24, and makes the infrared communication portion 20 produce an infrared signal indicating the current operating state and transmit it to the remote control 2. Thus, as in the case where the power button 104 is pressed, upon receiving this infrared signal with the infrared communication portion 202 (STEP 2), the remote control 2 recognizes the source that is being reproduced by the main body 1 based on the infrared signal thus received, and stores it in the memory 206 as the current operating state (STEP 3).

As described above, in this example, by pressing the state changing button 104, it is possible to select the source to be reproduced by the main body 1 from among the signals from the electronic devices 3 connected to the external input terminals 18a to 18d. Incidentally, in order to reproduce any one of the broadcast signals received by the tuners 11a to 11d as a source, it is necessary simply to specify a desired broadcast signal by pressing a corresponding one of the broadcast specification buttons 103a to 103d.

EXAMPLE 2

Example 2 differs from the above-described Example 1 in that the remote control 2 does not store the operating state of the main body 1, and source change operation performed when the state changing button 104 of the remote control 2 is pressed is performed in the main body 1. In this example, the state changing table indicating the order in which the source to be reproduced is changed is stored in the memory 24 of the main body 1. Hereinafter, with reference to a flow chart shown in FIG. 5, source change operation performed when the state changing button 104 of the remote control 2 is pressed will be described.

Figure 5:
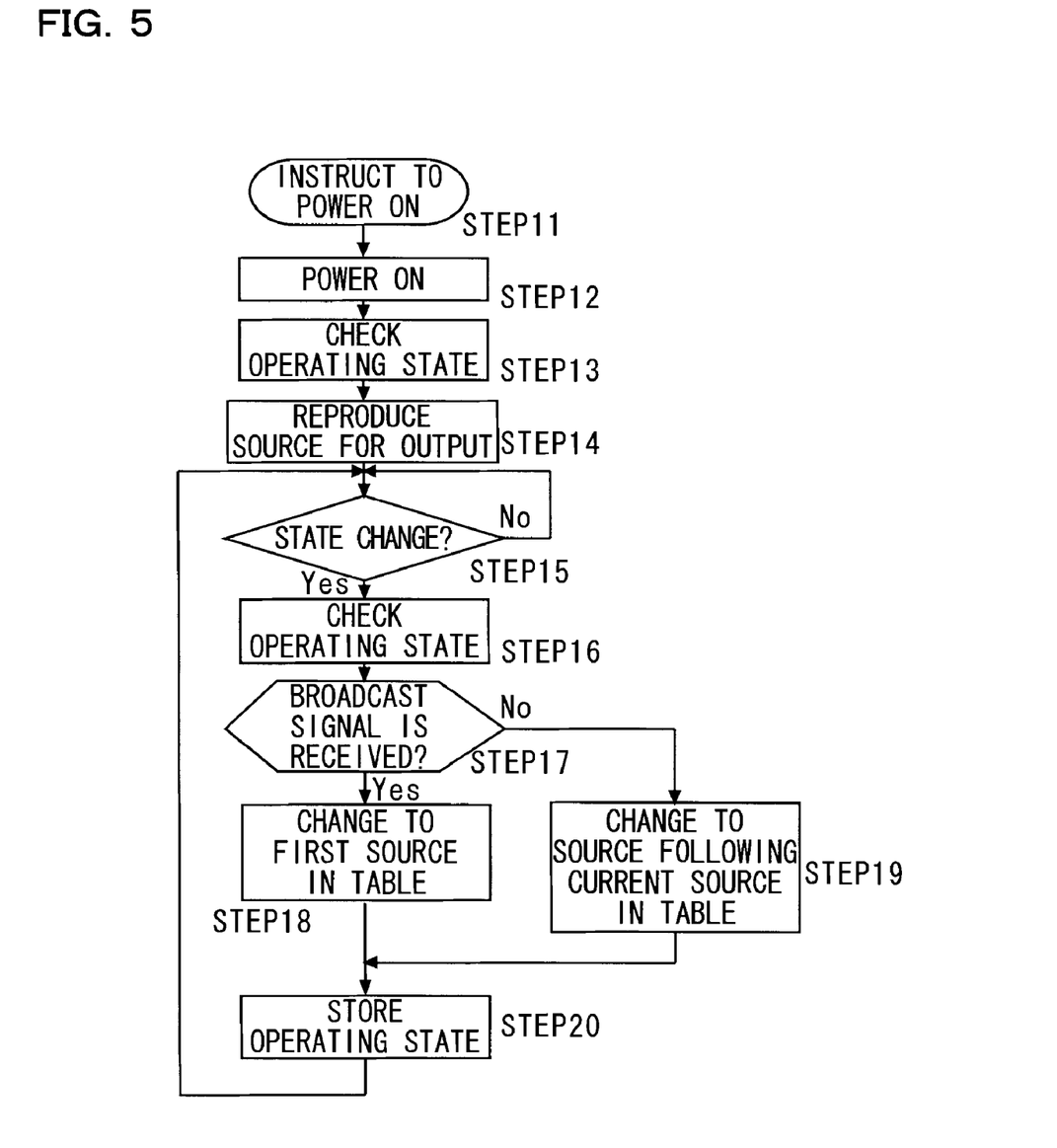
FIG. 5 is a flow chart showing the operating state of the main body of the broadcast signal receiving apparatus in Example 2.

In the remote control 2, a power-on infrared signal is transmitted from the infrared communication portion 202 as a result of the power button 105 being pressed, and the main body 1 receives the power-on infrared signal thus transmitted with the infrared communication portion 20 (STEP 11). When the power to the main body 1 is turned on (STEP 12), the main body 1 reads the operating state stored in the memory 24 so as to check the source that had been reproduced at the last power-off (STEP 13). As a result, as in Example 1, in the main body 1, the images and sound represented by the source identified by the operating state stored in the memory 24 are reproduced and outputted from the image display portion 16 and the loudspeaker portion 17, respectively (STEP 14).

Thereafter, it is checked whether or not an infrared signal instructing to change a source, the infrared signal produced as a result of the state changing button 104 being pressed, is transmitted from the remote control 2 (STEP 15). Upon receiving this infrared signal with the infrared communication portion 20 (Yes), the main body 1 reads the current operating state stored in the memory 24 so as to check the source that is currently reproduced (STEP 16). By checking the current operating state of the main body 1 read from the memory 24, it is judged whether or not the main body 1 is receiving a broadcast signal (STEP 17).

If the broadcast signal is found to be being received by any one of the tuners 11a to 11d (Yes in STEP 17), the main body 1 checks the state changing table stored in the memory 24, and starts to reproduce the first source in the state changing table (STEP 18). That is, in this example, the external input 1 starts to be reproduced. As a result, the main body 1 is made to operate so that the image and audio signals from the external input terminal 18a are fed to the image processing portion 13 and the audio output portion 14, respectively.

If any one of the external inputs 1 to 4 is found to be being reproduced as a source (No in STEP 17), the main body 1 checks the state changing table stored in the memory 24, and starts to reproduce a source following the source that is currently reproduced (STEP 19). That is, in a case where the external input 1 is found to be being reproduced, the external input 2, which follows the external input 1, starts to be reproduced. As a result, the input selector 19 is made to feed the image and audio signals from the external input terminal 18b to the image processing portion 13 and the audio output portion 14, respectively.

After the operating state of the main body 1 is changed as a result of the operations in STEPs 17 and 18, the current operating state thus changed, including the source, is stored in the memory 24 (STEP 20). Thereafter, the procedure goes back to STEP 15, and it is checked again whether or not an infrared signal instructing to change a source, the infrared signal produced as a result of the state changing button 104 being pressed, is transmitted from the remote control 2.

As described above, also in this example, as is the case with Example 1, by pressing the state changing button 104 provided in the remote control 2, it is possible to select the source to be reproduced by the main body 1 from among the signals from the electronic devices 3 connected to the external input terminals 18a to 18d. Incidentally, in order to reproduce any one of the broadcast signals received by the tuners 11a to 11d as a source, it is necessary simply to specify a desired broadcast signal by pressing a corresponding one of the broadcast specification buttons 103a to 103d.

EXAMPLE 3

Example 3 differs from Examples 1 and 2 in that sources to be changed based on the state changing table include not only an external input but also a broadcast signal received by the tuner. Hereinafter, assuming that, as in Example 1, a source to which the current source is changed to be reproduced by the main body 1 is specified by using the remote control 2, source change operation of this example will be described with reference to a flow chart shown in FIG. 6. Note that, in FIG. 6, such operational steps as are found also in FIG. 4 will be identified with common reference numerals, and their detailed explanations will not be repeated.

Figure 6:
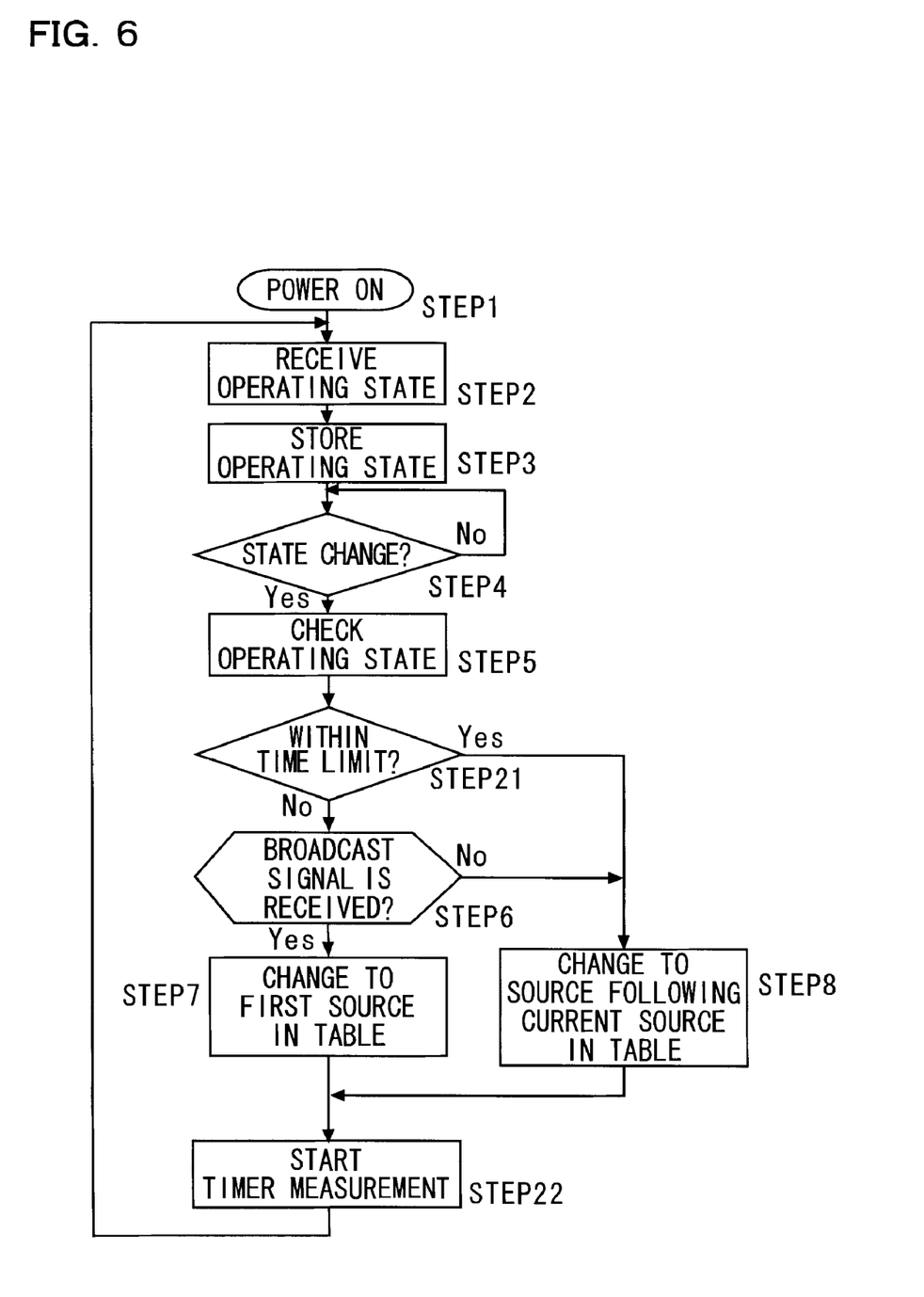
FIG. 6 is a flow chart showing the operating state of the remote control of the broadcast signal receiving apparatus in Example 3.

First, in this example, it is assumed that the source to be reproduced is changed in the following order: (1) an external input 1 received through the external input terminal 18a→(2) an external input 2 received through the external input terminal 18b→(3) an external input 3 received through the external input terminal 18c→(4) an external input 4 received through the external input terminal 18d→(5) terrestrial analog broadcasting received by the tuner 11a→(6) terrestrial digital broadcasting received by the tuner 11b→(7) BS broadcasting received by the tuner 11c→(8) CS broadcasting received by the tuner 11d. A state changing table indicating the above order is stored in the memory 206 of the remote control 2.

As is the case with Example 1, when power-on of the main body 1 is instructed by pressing the power button 105 (STEP 1), in the main body 1, the images and sound represented by the source identified by the operating state stored at the last power-off are reproduced and outputted from the image display portion 16 and the loudspeaker portion 17, respectively. Then, an infrared signal indicating the source that is currently reproduced is transmitted from the main body 1. Upon receiving the infrared signal with the infrared communication portion 202 (STEP 2), the remote control 2 stores it in the memory 206 as the current operating state (STEP 3). Then, the remote control 2 checks whether the state changing button 104 is pressed or not (STEP 4).

If the state changing button 104 is found to be pressed (Yes in STEP 4), the source that is currently reproduced by the main body 1 is checked (STEP 5). Then, it is checked whether or not the time elapsed after the state changing button 104 was last pressed falls within the time limit based on the time measured by the timer 203 (STEP 21). If the time elapsed after the state changing button 104 was last pressed is found to exceed the time limit (No in STEP 21), as in Example 1, the operations from STEP 6 to STEP 7 or 8 are performed, thereby transmitting, to the main body 1, an infrared signal specifying a source to which the currently reproduced source is changed.

If the time elapsed after the state changing button 104 was last pressed is found to fall within the time limit (Yes in STEP 21), the procedure proceeds to STEP 8, and an infrared signal for instructing to reproduce a source following the source that is currently reproduced is transmitted to the main body 1.

When an infrared signal instructing to change a source reproduced by the main body 1 is produced by the infrared communication portion 202 and is then transmitted in STEP 7 or 8, the timer 203 is initialized, and starts to measure the time for measurement of the time limit used in STEP 21 (STEP 22). Thereafter, as in Example 1, upon receiving the infrared signal from the main body 1 with the infrared communication portion 202 (STEP 2), the remote control 2 stores a source identified by the received infrared signal as a source that is being reproduced by the main body 1 in the memory 206 as the current operating state (STEP 3).

With the operations as described above, unlike Example 1, Example 3 makes it possible to specify any one of the broadcast signals received by the tuners 11a to 11d as a source reproduced by the main body 1 by pressing the state changing button 104 consecutively. Example 3 described above deals with a case where the remote control 2 checks a source to which the currently reproduced source is changed, and makes it known to the main body 1. However, as in Example 2, Example 3 may be modified so that the main body 1 is made to check a source to which the currently reproduced source is changed.

As in Example 2, if the main body 1 checks a source to which the currently reproduced source is changed, the state changing table of this example is stored in the memory 24 of the main body 1. In addition, when the infrared signal produced as a result of the state changing button 104 being pressed is received, the timer 22 starts to measure the time. This allows the main body 1 to check whether or not the state changing button 104 of the remote control 2 is pressed consecutively based on the time measured by the timer 22.

The above modification can be achieved by performing the procedure shown in the flow chart of FIG. 5 as follows. After the operation in STEP 16, the operation in STEP 21 in the flow chart shown in FIG. 6 is performed, and, after the operation in STEPs 18 and 19, the operation in STEP 22 in the flow chart shown in FIG. 6 is performed.

EXAMPLE 4

Example 4 differs from Example 3 in that a plurality of state changing tables are provided, and a state changing table that is put to use is changed depending on the type of source that is being reproduced when the state changing button is pressed after the time limit is over. Hereinafter, assuming that, as in Example 3, a source to which the current source is changed to be reproduced by the main body 1 is specified by using the remote control 2, source change operation of this example will be described with reference to a flow chart shown in FIG. 7. Note that, in FIG. 7, such operational steps as are found also in FIG. 6 will be identified with common reference numerals, and their detailed explanations will not be repeated.

Figure 7:
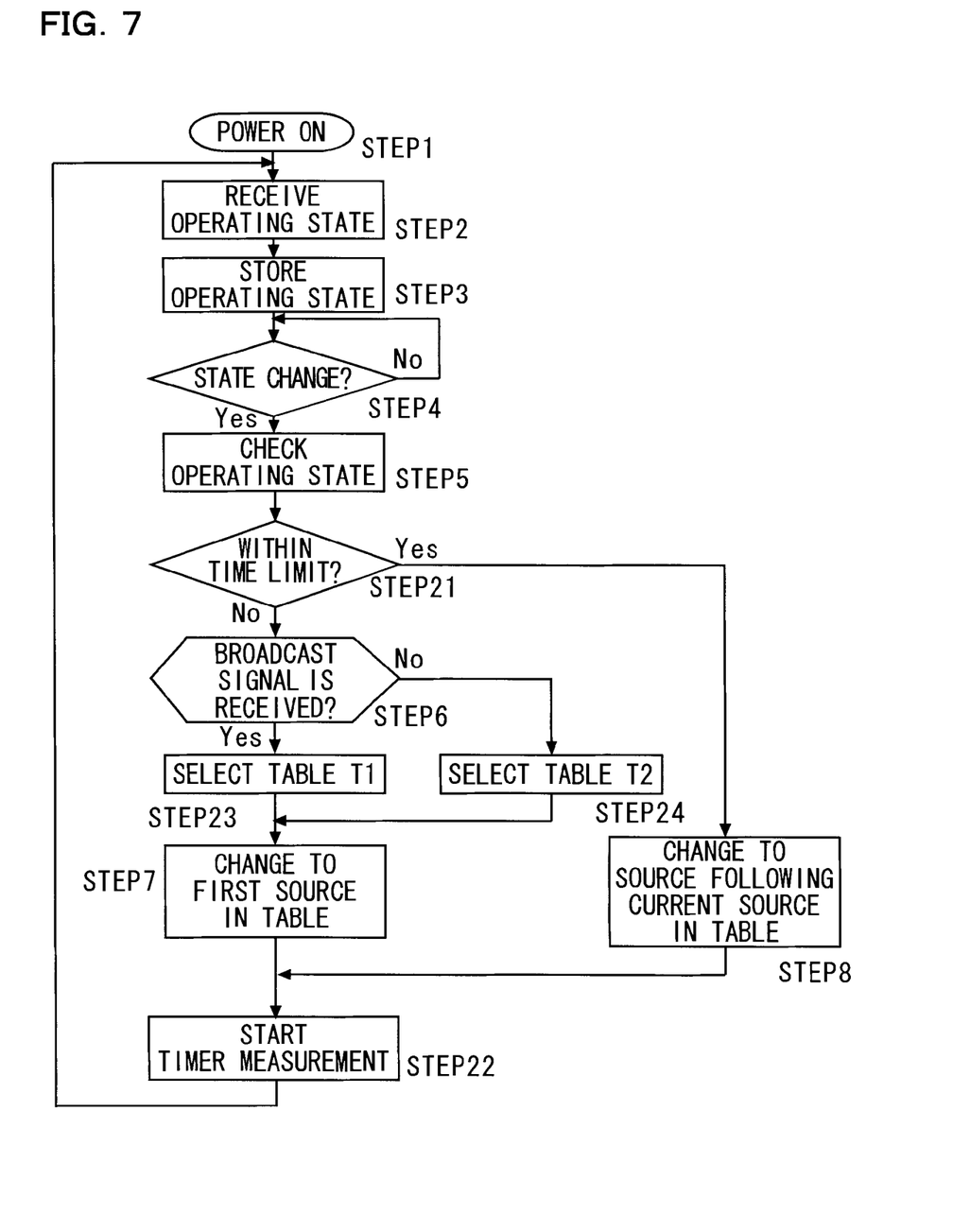
FIG. 7 is a flow chart showing the operating state of the remote control of the broadcast signal receiving apparatus in Example 4.

In this example, first and second state changing tables T1 and T2 each indicating the order in which the source to be reproduced is changed are stored in the memory 206 of the remote control 2. As in Example 3, in the first state changing table T1, it is assumed that the source to be reproduced is changed in the following order: (1) an external input 1 received through the external input terminal 18a→(2) an external input 2 received through the external input terminal 18b→(3) an external input 3 received through the external input terminal 18c→(4) an external input 4 received through the external input terminal 18d→(5) terrestrial analog broadcasting received by the tuner 11a→(6) terrestrial digital broadcasting received by the tuner 11b→(7) BS broadcasting received by the tuner 11c→(8) CS broadcasting received by the tuner 11d.

Unlike the first state changing table T1, in the second state changing table T2, it is assumed that the source to be reproduced is changed in the following order: (1) terrestrial analog broadcasting received by the tuner 11a→(2) terrestrial digital broadcasting received by the tuner 11b→(3) BS broadcasting received by the tuner 11c→(4) CS broadcasting received by the tuner 11d→(5) an external input 1 received through the external input terminal 18a→(6) an external input 2 received through the external input terminal 18b→(7) an external input 3 received through the external input terminal 18c→(8) an external input 4 received through the external input terminal 18d.

As in Example 3, in this example, after the power to the main body 1 is turned on, the operating state of the main body 1 is stored in the memory 206 (STEP 1 to STEP 3). Then, if the state changing button 104 is found to be pressed (Yes in STEP 4), the source that is currently reproduced by the main body 1 is checked, and it is checked whether or not the time elapsed after the state changing button 104 was last pressed falls within the time limit (STEP 5 and STEP 21). If the time elapsed after the state changing button 104 was last pressed is found to exceed the time limit (No in STEP 21), it is checked whether or not the main body 1 is receiving a broadcast signal (STEP 6).

If the main body 1 is found to be receiving a broadcast signal (Yes in STEP 6), the first state changing table T1 is specified as the state changing table that is referred to when the state changing button 104 is pressed (STEP 23). On the other hand, if the main body 1 is found to be reproducing any one of the external inputs 1 to 4 as a source (No in STEP 6), the second state changing table T2 is specified as the state changing table that is referred to when the state changing button 104 is pressed (STEP 24).

After the state changing table that is referred to is specified in STEP 23 or 24, the specified state changing table stored in the memory 206 is checked. Then, an infrared signal instructing to reproduce the first source in that state changing table is produced by the infrared communication portion 202, and is then transmitted to the main body 1 (STEP 7). That is, in a case where the first state changing table T1 is specified, the main body 1 is made to operate such that the input selector 19 feeds the image and audio signals from the external input terminal 18a to the image processing portion 13 and the audio output portion 14, respectively. On the other hand, in a case where the second state changing table T2 is specified, the main body 1 is made to operate such that the image and audio signals represented by the broadcast signal received by the tuner 11a are fed to the image processing portion 13 and the audio output portion 14, respectively.

If the time elapsed after the state changing button 104 was last pressed is found to fall within the time limit (Yes in STEP 21), the procedure proceeds to STEP 8, and a source following the source that is currently reproduced is checked based on the state changing table specified in STEP 23 or 24. Then, an infrared signal for instructing to reproduce a source following the source that is currently reproduced is transmitted to the main body 1. When an infrared signal instructing to change a source to be reproduced is transmitted in STEP 7 or 8, the timer 203 is initialized, and starts to measure the time (STEP 22). Then, the procedure goes back to STEP 2.

As described above, according to this example, when the state changing button 104 is pressed after the time limit is over, if the main body 1 is found to be receiving a broadcast signal, the operation is changed to an external input; if the main body 1 is found to be performing external input operation, the operation is changed to reception of a broadcast signal. As is the case with Example 3, by pressing the state changing button 104 consecutively, it is possible to change the currently reproduced source to a source listed in the specified state changing table.

As in Example 2, if the main body 1 checks a source to which the currently reproduced source is changed, the first and second state changing tables T1 and T2 of this example are stored in the memory 24 of the main body 1. In this case, as in Example 3, the operation in STEP 21 is performed. If the state changing button 104 is found to be pressed within the time limit, the procedure proceeds to STEP 19. On the other hand, if the time elapsed after the state changing button 104 was last pressed is found to exceed the time limit, the state changing table is specified, based on the source found in STEP 17, in the manner as in STEPs 23 and 24 shown in the flow chart of FIG. 7. Then, the procedure proceeds to STEP 18.

EXAMPLE 5

Example 5 differs from Example 1 in that, in addition to the above-described state changing table, a unique list table set by the user is provided. Hereinafter, assuming that, as in Example 1, a source to which the current source is changed to be reproduced by the main body 1 is specified by using the remote control 2, source change operation of this example will be described with reference to a flow chart shown in FIG. 9. Note that, in FIG. 9, such operational steps as are found also in FIG. 4 will be identified with common reference numerals, and their detailed explanations will not be repeated.

Figure 9:
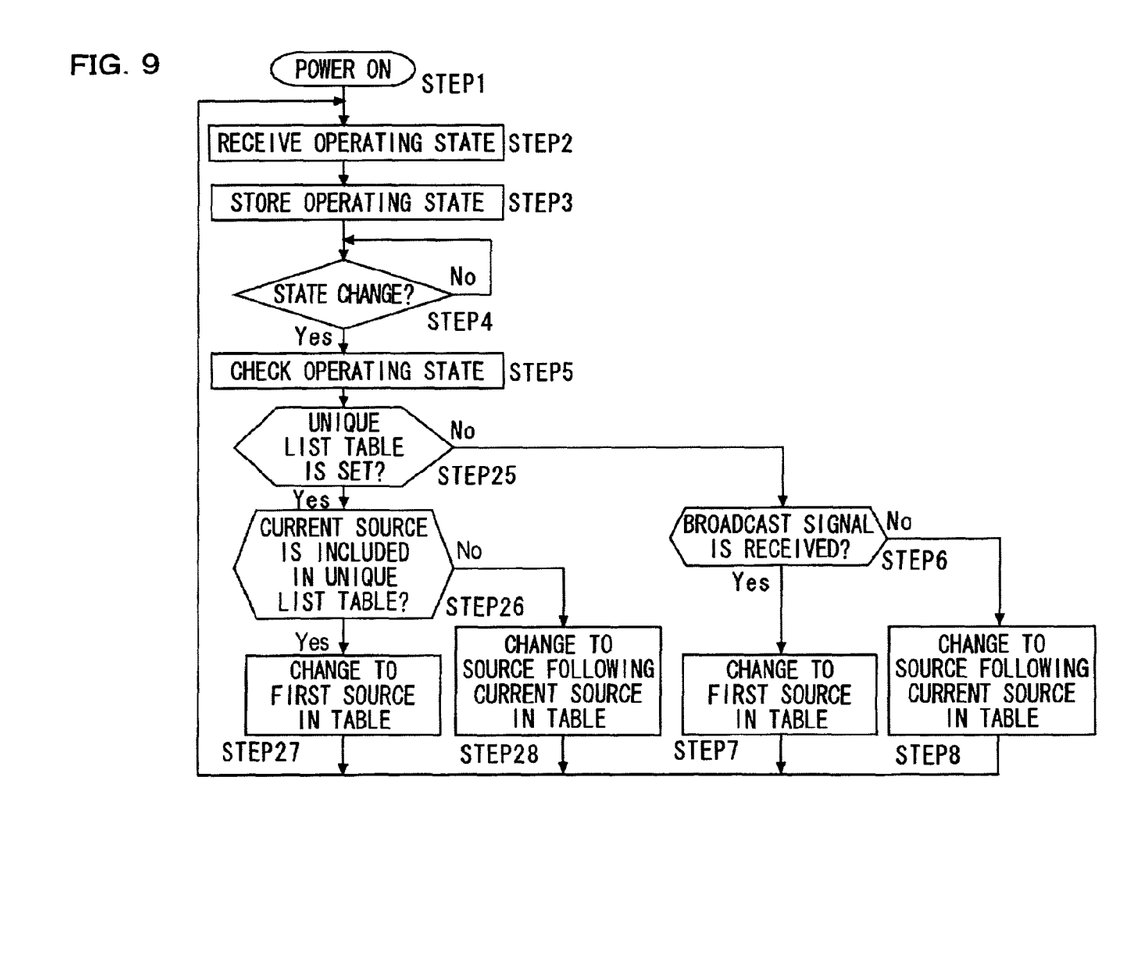
FIG. 9 is a flow chart showing the operating state of the remote control of the broadcast signal receiving apparatus in Example 5.

In this example, as in Example 1, it is assumed that the source specified in a state changing table T3 stored in the memory 206 of the remote control 2 is changed in the following order: (1) an external input 1 received through the external input terminal 18a→(2) an external input 2 received through the external input terminal 18b→(3) an external input 3 received through the external input terminal 18c→(4) an external input 4 received through the external input terminal 18d. In this example, in addition to the state changing table T3, a unique list table indicating the source selected by the user and the order in which it is changed is stored in the memory 206 of the remote control 2.

A brief description will be given below of how to set the unique list table stored in the memory 206. By operating the arrow buttons 106 and the OK button 107 of the remote control 2, a menu for changing the contents of the unique list table is displayed as a GUI on the image display portion 16 of the main body 1. An example of the GUI display displayed on the image display portion 16 as the menu for changing the contents of the unique list table is shown in FIG. 8.

Figure 8:
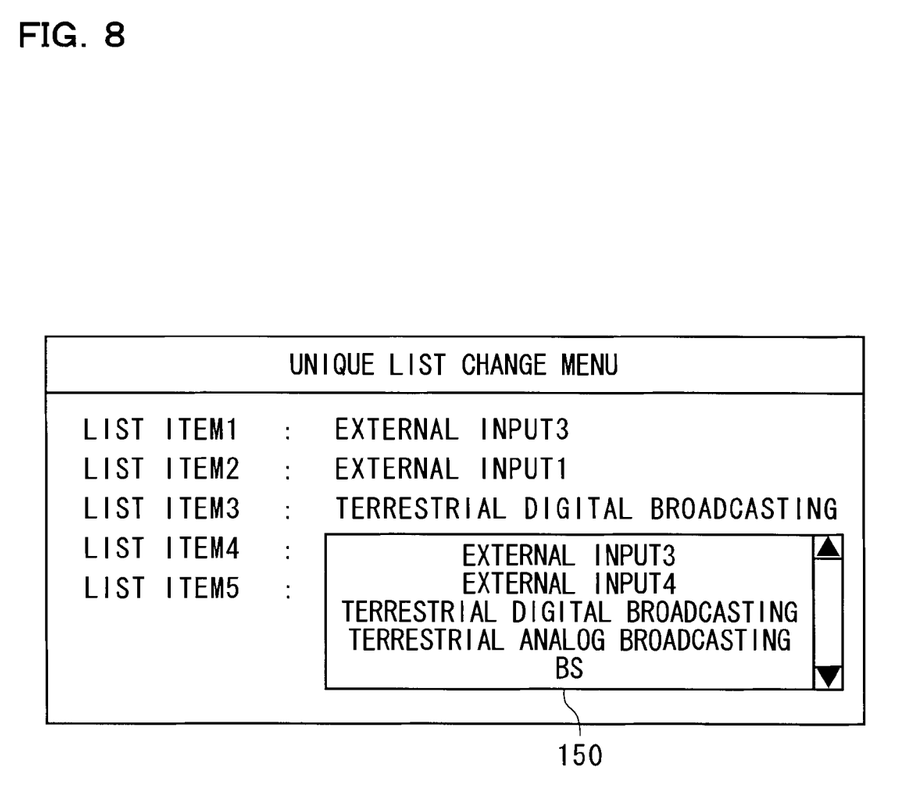
FIG. 8 is a diagram showing a GUI display for setting a unique list table in the broadcast signal receiving apparatus in Example 5.

The GUI display shown in FIG. 8 indicates that the source is changed in the order of list item 1, list item 2, list item 3, . . . . Each source set by the user is displayed at a corresponding place in the order (of the list items). When a place in the order (of the list items) is specified for setting a source, a window 150 for source setting appears. In this way, when the window 150 appears, the user specifies one of the sources displayed in the window 150 with a pointer, and selects it as a desired source. The unique list table is set in the manner as described above. Incidentally, the source included in the table may be selected not only from the external inputs 1 to 4 but also from different broadcast signals.

In a case where the unique list table is set in the manner as described above, the unique list table thus set may be temporarily stored in the memory 24 of the main body 1, and then be transmitted as an infrared signal from the infrared communication portion 20 to the remote control 2, such that it is stored in the memory 206 of the remote control 2. Furthermore, the order (of the list items) of the sources included in the unique list table may be sequentially stored in the memory 206 as soon as each source is set by using the GUI display shown in FIG. 8, and the set unique list table itself may be stored in the memory 206 at the completion of the setting operation.

Next, operations performed in this example when the state changing button 104 of the remote control 2 is pressed will be described. In this example, as shown in the flow chart of FIG. 9, as in Example 1, after the power to the main body 1 is turned on, the operating state of the main body 1 is stored in the memory 206, and it is checked whether the state changing button 104 is pressed or not (STEP 1 to STEP 4). If the state changing button 104 is found to be pressed (Yes in STEP 4), the source that is currently reproduced by the main body 1 is checked (STEP 5). Thereafter, in this example, it is checked whether or not the unique list table is stored in the memory 206 (STEP 25).

If the unique list table is found to be stored (Yes in STEP 25), it is checked whether or not the source that is found to be currently reproduced by the main body 1 in STEP 5 is included in the unique list table stored in the memory 206 (STEP 26). On the other hand, if the unique list table is found not to be stored (No in STEP 25), as in Example 1, the operations in STEP 6 to STEP 8 are performed by referring to the state changing table stored in the memory 206, so as to instruct to change the operating state of the main body 1.

In STEP 26, if the currently reproduced source is found not to be included in the unique list table (No), the unique list table stored in the memory 206 is checked. Then, an infrared signal for instructing to reproduce the first source in the unique list table is produced by the infrared communication portion 202, and is then transmitted to the main body 1 (STEP 27). On the other hand, if the currently reproduced source is found to be included in the unique list table (Yes), the unique list table stored in the memory 206 is checked. Then, an infrared signal for instructing to reproduce a source following the source that is currently reproduced is produced by the infrared communication portion 202, and is then transmitted to the main body 1 (STEP 28).

The infrared signal transmitted to the main body 1 in STEP 7, 8, 27, or 28 is received by the infrared communication portion 20 of the main body 1, and the operating state of the main body 1 is changed such that the specified source is reproduced. Thereafter, in the main body 1, the current operating state including the source thus changed is stored in the memory 24, and an infrared signal indicating that operating state is produced by the infrared communication portion 20, and is then transmitted to the remote control 2. Thus, as in Example 1, the remote control 2 receives the infrared signal transmitted from the main body 1 with the infrared communication portion 202, recognizes the source that is being reproduced by the main body 1, and stores it in the memory 206 as the current operating state (STEP 2 and STEP 3).

With the operations as described above, unlike Example 1, Example 5 makes it possible to change the source reproduced by the main body 1 by using the unique list table set by the user. This makes it possible, for example, to remove from the unique list table the external input that is not connected to the electronic device 3 and thus is not required to be selected. Example 5 described above deals with a case where the remote control 2 checks a source to which the currently reproduced source is changed, and makes it known to the main body 1. However, as in Example 2, Example 5 may be modified so that the main body 1 is made to check a source to which the currently reproduced source is changed.

As in Example 2, if the main body 1 checks a source to which the currently reproduced source is changed, the state changing table of this example is stored in the memory 24 of the main body 1, and the unique list table set by using the GUI display on the image display portion 16 is also stored in the memory 24. In the main body 1, every time the infrared signal is transmitted from the remote control 2 as a result of the state changing button 104 of the remote control 2 being pressed, checking operation is performed in the manner similar to STEP 5 to STEP 8 and STEP 25 to STEP 28. In this way, the source reproduced by the main body 1 is changed by referring to the state changing table or the unique list table.

Incidentally, Example 5 may be modified so that, as in Example 3, the remote control 2 is made possible to check whether or not the state changing button 104 is pressed consecutively by adding STEP 21 and STEP 22 shown in the flow chart of FIG. 6, and, if the state changing button 104 is found to be pressed consecutively, the currently reproduced source is changed to a source that follows it in the specified state changing table or unique list table. Furthermore, Example 5 may be modified so that, as in Example 4, a plurality of unique list tables are set instead of a plurality of state changing tables, and the unique list table is changed depending on the type of source that is being reproduced by the main body 1.

All the examples described above deal solely with cases in which the number of external inputs is four. However, the number of external inputs is not limited to four; any number of external inputs may be provided as long as there are a plurality of external inputs. The descriptions heretofore deal with cases in which the broadcast signal to be reproduced can be specified by using the broadcast specification buttons 103a to 103d of the remote control 2. However, it is also possible to assign the numbers attached to the buttons 101 to the external inputs. This makes it possible to directly specify a desired external input by performing unusual operation, such as pressing the button 101 assigned the number for the desired external input longer than usual.

As described above, according to the present invention, when the main body is reproducing a broadcast signal received by the tuner as a source, it is possible to change the operating state in such a way that an external input signal is preferentially reproduced as a source by performing a specific operation with the remote control. This makes it possible not only to perform a desired operation without adding an extra button to the remote control having a conventional button layout, but also to prevent an increase in the number of buttons, and hence in the size of the remote control.

The present invention can be applied to broadcast signal receiving apparatuses provided with a tuner part and an external input part, such as television apparatuses, VCR recorders, DVD recorders, HDD recorders, and tuner devices.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A broadcast signal receiving apparatus comprising:

a reproducing-outputting portion reproducing and outputting, as a source, one of a plurality of broadcast signals and external input signals that are fed in;

a state changing button receiving an operation for changing the source; and a memory storing a first state changing table in which an order in which to change the source is sequentially set with one of the external input signals as a first source, wherein, when the state changing button is operated, if a broadcast signal is being reproduced and outputted, the reproducing-outputting portion performs state change such that the external input signal set as the first source in the first state changing table is reproduced and outputted, wherein the memory further stores a unique list table in which the order in which to change the source can be set for a desired order, and wherein, when the unique list table is set, the reproducing-outputting portion performs state change by referring to the unique list table and, when the unique list table is not set, the reproducing-outputting portion performs state change by referring to the first state changing table.

2. The broadcast signal receiving apparatus of claim 1, wherein, when state change is performed by referring to the unique list table, if a current source is not included in the unique list table, the reproducing-outputting portion performs state change such that a source set as a first source in the unique list table is reproduced and outputted and, if the current source is included in the unique list table, the reproducing-outputting portion performs state change such that a source set as a source next to the current source in the unique list table is reproduced and outputted.

* * * * *